Sept. 30, 1930.  C. M. SAMUELSSON  1,777,019
TRAVERSING HOIST
Filed Sept. 21, 1927  2 Sheets-Sheet 1
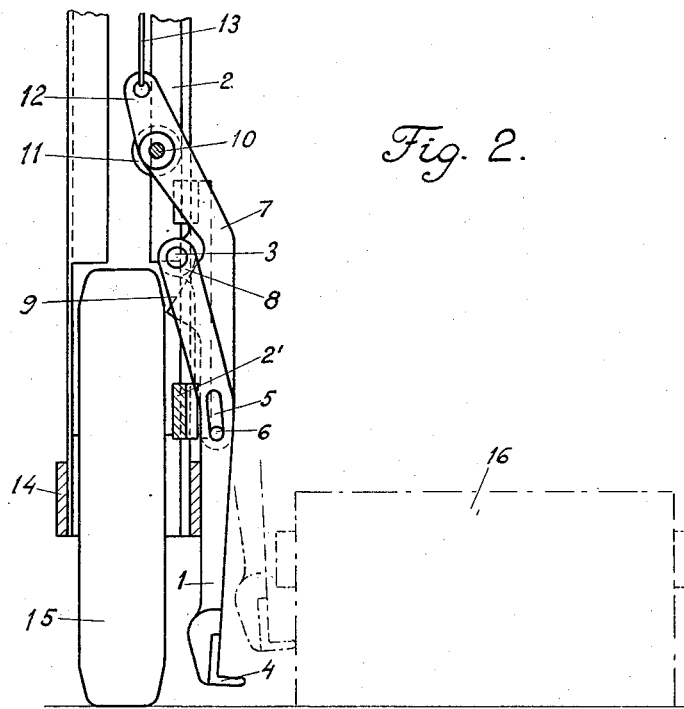
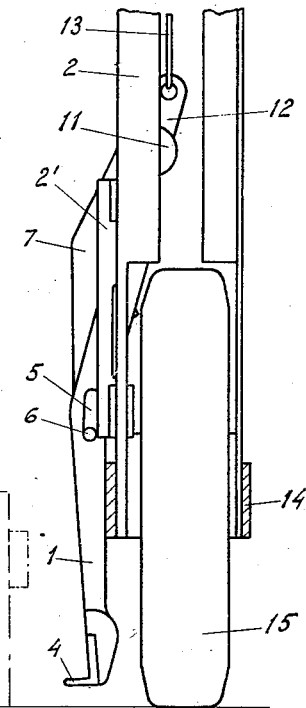
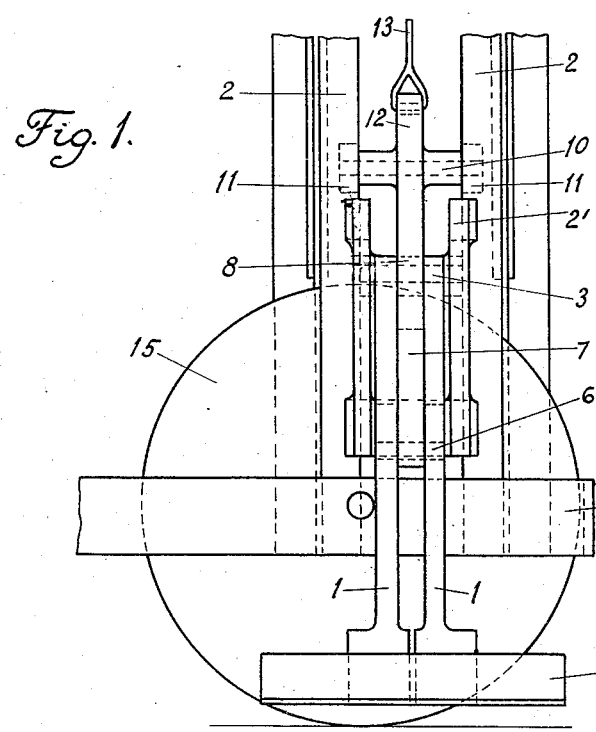
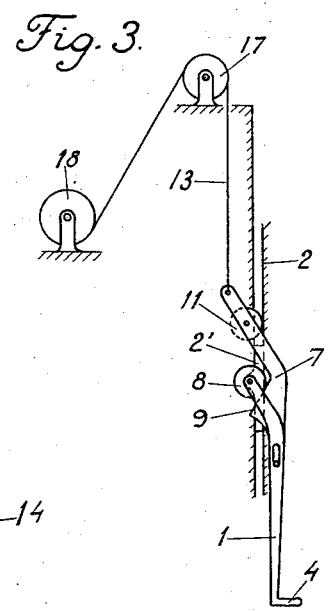
INVENTOR:
Carl Mauritz Samuelsson
BY Reeves, Boyer & Bakelar
ATTORNEYS.

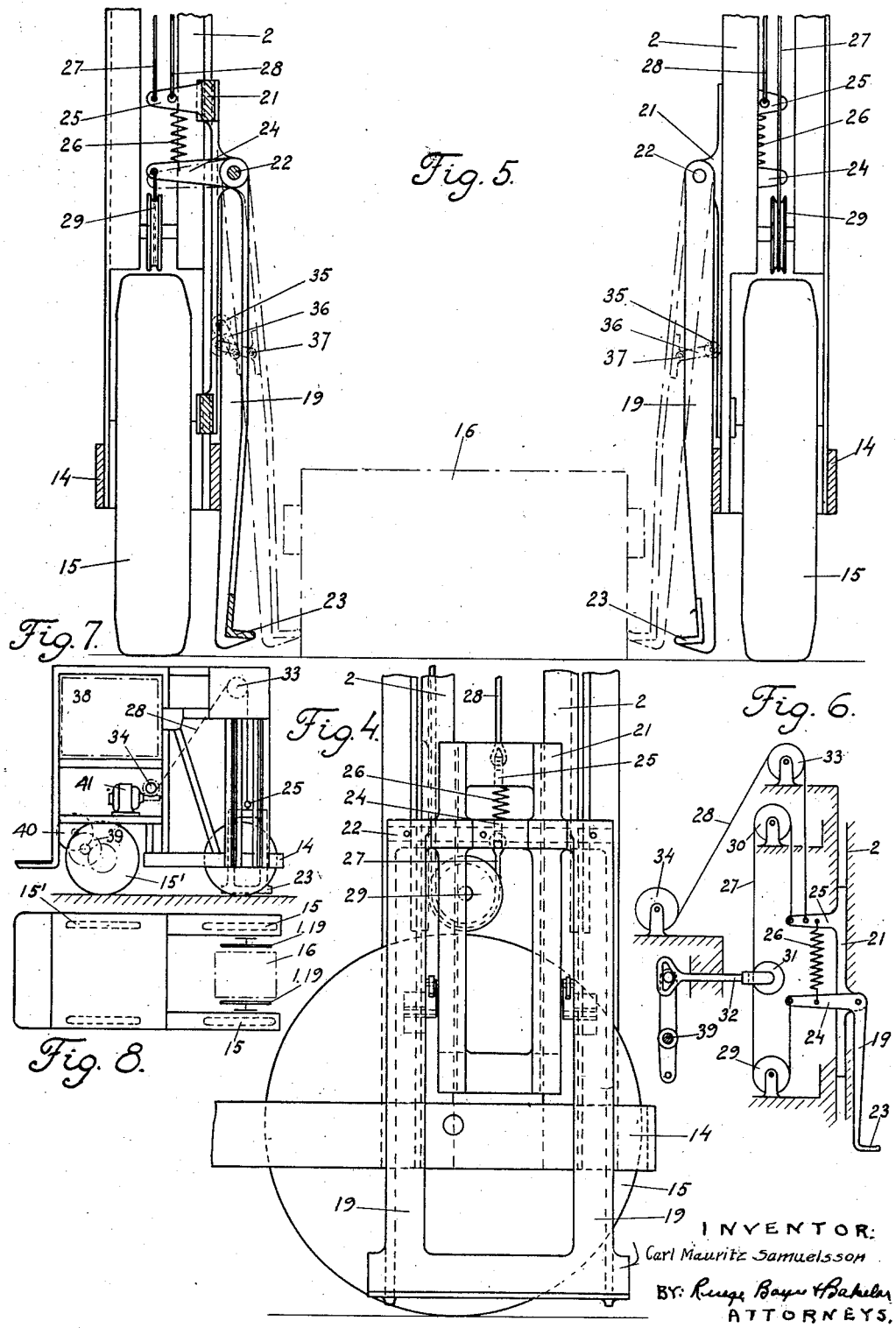

Patented Sept. 30, 1930

1,777,019

UNITED STATES PATENT OFFICE

CARL MAURITZ SAMUELSSON, OF STOCKHOLM, SWEDEN

TRAVERSING HOIST

Application filed September 21, 1927, Serial No. 220,869, and in Sweden October 8, 1926.

This invention relates to improvements in portable hoisting and carrying apparatus, the object of the invention being to provide an apparatus of this character which may be operated either manually or provided with an electric motor or other machine power for operating it, and by means of which apparatus objects may be raised and transported on the apparatus and deposited at any desired place.

With the foregoing and other objects in view, which will appear as the description proceeds, the invention consists in the novel features of construction and combination of parts which will be more fully described hereinafter and particularly pointed out in the claims.

In the drawings accompanying this specification,

Fig. 1 is a side view of a portion of a hoisting apparatus embodying the present invention;

Fig. 2 is an end view of the apparatus shown in Fig. 1;

Fig. 3 is a diagrammatic side view illustrating the operation of the apparatus;

Fig. 4 is a side view similar to Fig. 1, showing a modified construction of apparatus;

Fig. 5 is an end view of the apparatus shown in Fig. 4;

Fig. 6 is a view similar to Fig. 3, illustrating the operation of the apparatus shown in Figs. 4 and 5;

Fig. 7 is a side view illustrating a motor-driven apparatus; and

Fig. 8 is a plan view of the apparatus shown in Fig. 7.

Referring to Figs. 1 and 2, 14 designates a truck-frame mounted on wheels 15. Mounted on said frame near each side edge thereof are a pair of standards 2 having formed therein vertical guideways for the reception and guidance of a crosshead 2' adapted for reciprocation in said guideways. Pivotally supported on and depending from a pin 3 mounted in said crosshead is a hoisting lever 1, said lever being provided at its lower end with a hook-shaped projection 4, the hooks of the levers at opposite sides of the frame being directed toward each other. Each of the levers 1 is also provided at a point above its hook with an elongated slot 5 for the reception of a pin 6 carried by a lever 7, which is perforated at its upper end, as indicated at 12 for the reception of a hoisting cable 13. The lever 7 is provided with a laterally extending pin 10 on which are mounted rollers 11 adapted to operate in contact with the standards 2, thereby to guide the lever in its vertical movements. The pivot pin 3 of the lever 1 carries a roller 8 operating in contact with an oblique surface 9 formed on the lever 7. In Figs. 2 and 5 I have illustrated in broken lines an object 16 to be lifted by the apparatus, the operation of which will be described hereinafter.

In the modified construction shown in Figs. 4, 5 and 6, the hoisting levers 19 are each supported on a shaft 22 mounted in crossheads 21 disposed for vertical movement in the guides of the standard 2, said levers each having at its lower end a hook-shaped projection 23 and connected at its upper end by means of its pivotal shaft 22 to a lever 24. The crosshead 21 is provided with a projection 25 to which is attached a spring 26, a tensioning cable 27 and a hoisting cable 28. The tensioning cable 27 is guided over pulleys 29 and 30 and is attached at its opposite ends respectively to the projection 25 and the lever 24. For placing the cable 27 under tension, an arm is pivotally mounted at 39 (Fig. 6) on a fixed portion of the apparatus, said arm having pivotally attached thereto a link 32, carrying a pulley 31 in engagement with the cable 27. As will be readily seen from Fig. 6, if the link 32 is shifted toward the left, it will exert a pull on the cable 27, thus placing the same under tension. The hoisting cable 28 is guided over a pulley 33 and coiled on a drum 34.

The operation of the apparatus is as follows:

With the apparatus shown in Figs. 1, 2 and 3, the cable 13 at each side of the truck passes upward over a pulley 17 mounted on a fixed part of the apparatus, and thence to a drum 18, it being understood that the drums for the cables at opposite sides of the truck may be secured on a common shaft. When the drums 18 are rotated so as to exert an upward pull on the cables 13, the levers 7 are lifted, during which movement the rollers 11 roll on the standards 2, while the inclined cam surfaces 9 of the levers 7 press against the rollers 8 and thus force the levers 7 to swing toward each other. During such swinging movement, the pins 6 carried by the levers 7 move in the slots 5 of the levers 1 until they finally arrive at the upper ends of said slots, thus causing the levers 1 to swing toward each other, as indicated in broken lines in Fig. 2. By the continued upward movement of the cables 13, the hoisting levers 1, as will be obvious, will engage an object 16 and raise it to a suitable height, whereupon the apparatus may be moved with the object 16 suspended between the hooks or projections 4 and may be deposited at any desired place.

In the operation of the apparatus shown in Figs. 4, 5 and 6, the levers 19 are carried to the position shown in dot and dash lines in Fig. 5 by first shifting the rods 32 so as to place the cables 27 under tension, thereby pulling down the arms 24 and thus swinging the levers 19 toward each other until their hooks 23 engage the object 16 to be raised. This operation is possible regardless of the height of the levers 19. With the hooks 23 thus engaging the object 16, the drums 34 are then rotated to wind up the cables 28 and thereby raise the cross heads 21 together with the levers 19 and the object engaged thereby.

Each of the levers 19 has pivoted thereto at 37 an arm 36 carrying at its free end a roller 35, which roller is maintained by gravity in engagement with the edge of the standard 2, so that as the lever 19 swings away from the standard the arm 36 will swing to the position shown in broken lines in Fig. 5 and thus form a support for the levers during the hoisting operation. When the load has been deposited, the tension of the cables 27 must then be released, whereupon, under the tension of springs 26 acting on arms 24, the levers 19 will swing back to their normal position shown in full lines in Fig. 5. Because of the oblique position of the arms 36, the weight of the returning levers 19 will cause the rollers 35 to move on the standards, thus swinging the arms 36 back to their normal position.

The sides of the apparatus are preferably left open for convenience in operation. In Fig. 7 I have indicated in dotted lines a motor 40 and gearing 39 for operating the traveling wheels 15′, it being understood that a suitable steering device will also be employed. In this figure is also illustrated a motor 41 for rotating the hoisting drums 34, a battery 38 being provided for furnishing current to both of said motors.

While I have described in detail the structures herein illustrated, it is to be understood that I do not thereby limit my invention to the precise features of construction shown, as I am aware that many mechanical changes and modifications may be made therein without departing from the spirit and scope of the invention as set forth in the claims appended hereto.

Having thus described my invention, what I claim is:

1. A portable hoisting apparatus, comprising in combination, a wheeled frame, vertical supporting standards mounted on said frame at opposite sides thereof, a crosshead mounted for vertical reciprocating motion on each of said standards, a lever pivoted to each of said cross-heads and having a hook-shaped lower end, said levers normally lying approximately parallel with said standards, means for bodily raising said levers and crossheads, and means connected to the crossheads and to the levers and operative at any height of the levers to swing said levers on their pivots thereby to carry their lower ends toward each other.

2. A portable hoisting apparatus, comprising in combination, a wheeled frame, vertical supporting standards mounted on said frame at opposite sides thereof, a crosshead mounted for vertical reciprocating motion on each of said standards, a lever pivoted to each of said crossheads and having a hook-shaped lower end, members vertically and pivotally movable on said standards, each of said members having a cam projection normally disposed beneath the pivot of one of said levers, said levers and movable members having a pin and slot connection at a point intermediate the pivot and the free end of the lever, and means for raising said movable members thereby first to swing said levers on their pivots toward each other and then to raise the levers and crossheads.

In testimony whereof I have signed my name to this specification.

CARL MAURITZ SAMUELSSON.